Inventor
SAMUEL A. SNELL
By Beaman & Lang
Attorneys

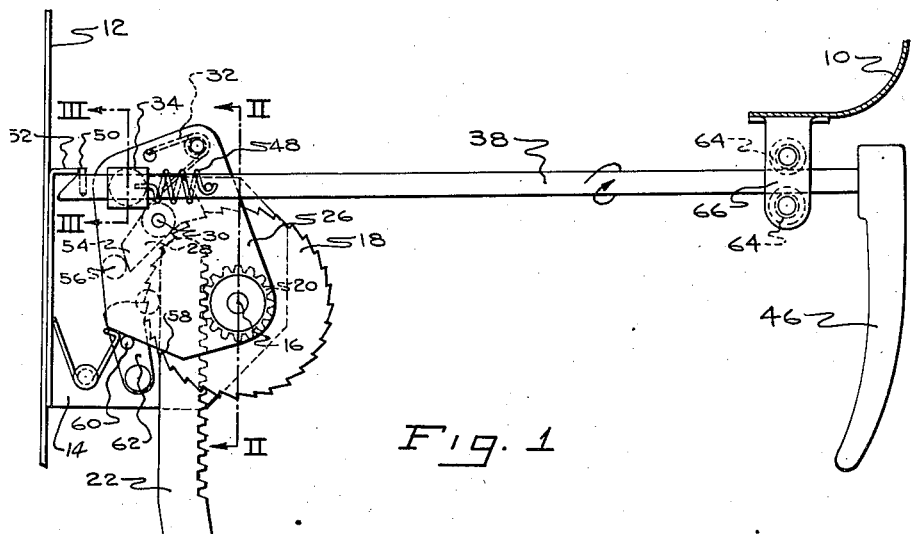
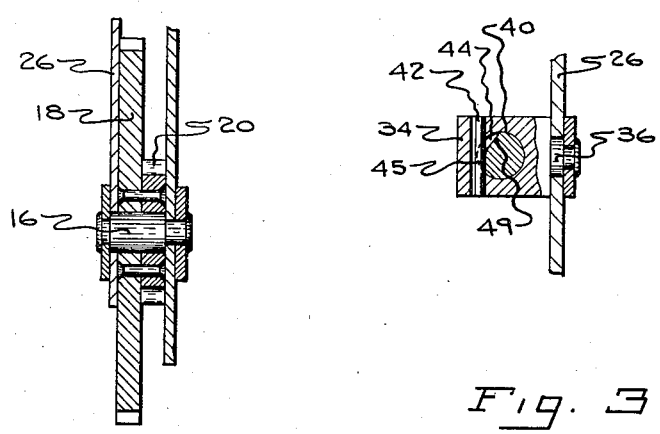
Fig. 1
Fig. 2
Fig. 3
Inventor
SAMUEL A. SNELL
By Beaman & Langford
Attorneys Sept. 21, 1943.   S. A. SNELL   2,329,859
BRAKE ACTUATING MECHANISM
Filed Dec. 11, 1939   2 Sheets-Sheet 2

Patented Sept. 21, 1943

2,329,859

UNITED STATES PATENT OFFICE 2,329,859

BRAKE ACTUATING MECHANISM

Samuel A. Snell, Jackson, Mich., assignor to Townsend F. Beaman, Jackson, Mich., as trustee Application December 11, 1939, Serial No. 308,609

3 Claims. (Cl. 74—503)

The present invention relates to improvements in manually energized mechanism for remote application of force. More specifically, the invention is concerned with an improved parking brake actuating mechanism for automobiles.

Formerly, it was the practice to extend the parking brake of an automobile up through the floor. Recently however, to clear the floor, the brake lever has been pivotally supported behind the instrument panel with the hand grip below the pivot point and accessible just below the panel and to the left of the steering wheel post for operation by the left hand. In order to have the hand grip readily accessible to the driver, the arm through which the lever may swing in fully applying the brake must be held to a minimum in order to avoid the projection of the hand grip to a point where it would be struck by the driver's knee in leaving and taking the driver seat from the left-hand side of the automobile. This necessity for reducing the swinging arc of the lever has prevented the provision of adequate mechanical leverage with the result that the application of the parking brake is difficult. It is generally admitted that the incapability of the average person to fully apply the parking brake accounts for the tendency upon the part of the driver to omit the release of the partly applied brake before driving away.

Thus an object of the present invention is to provide improved mechanism which is adaptable, among other things, for use as an "off the floor" parking brake actuator, the mechanism being characterized by an unusual out-of-the-way non-releasing movement following an outward brake applying movement.

Another object is to provide an "off the floor" brake actuator having a ratcheting action enabling the brake to be applied through one or more repeated strokes.

Another object is to provide a brake actuator having a pair of rotated parts of different diameters, the smaller of which is geared to the brakes and the other to a hand actuated means through a ratchet mechanism.

A further object is to provide a brake actuator mechanism for automobiles having a hand grip portion which is moved outwardly into the driver compartment to apply the brakes and then movable inwardly out of the way without brake release.

A still further object is to provide novel brake applying and releasing mechanism characterized by its ease of operation and safety against unintentional release.

Figure 4:
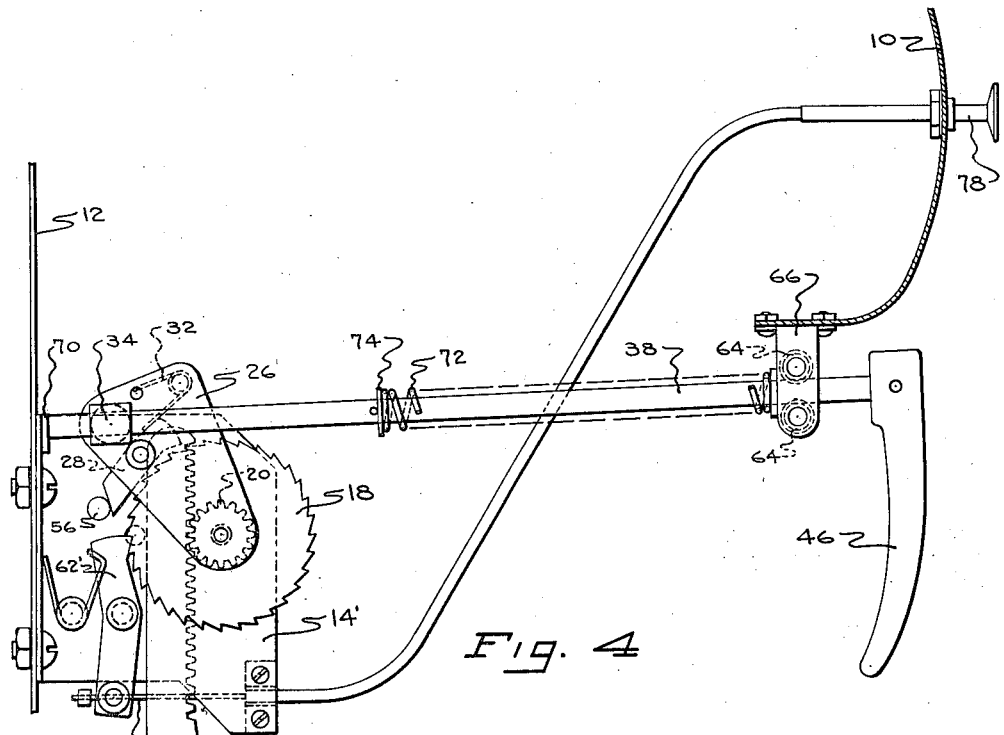
Figures 5, 6:
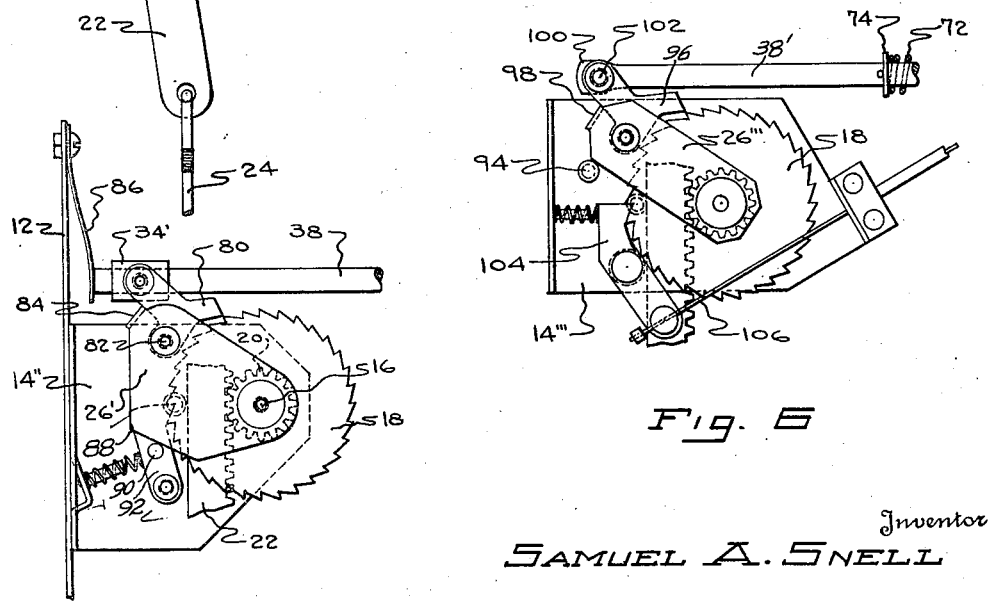

These and other objects will be apparent from the following specification when taken with the accompanying drawings, in which Fig. 1 is a side elevational view of the brake actuator mechanism shown mounted between the cowl and instrument panel, Fig. 2 is a cross-sectional view taken on line II—II of Figure 1, Fig. 3 is a cross-sectional view taken on line III—III of Figure 1, Fig. 4 is a view similar to Figure 1 of another form of the invention having a separate release mechanism, and Figs. 5 and 6 are partial side elevational views of further modified forms of the invention.

In the drawings the instrument panel 10 is shown spaced from the cowl 12 upon which a bracket 14 is mounted for supporting the pin 16 upon which rotates a unit comprising a ratchet wheel 18 fixed to a pinion 20. Meshing with the pinion 20 is a rack 22 to which the cable 24 extending to the brakes is connected. Having free pivotal movement upon the shaft 16 relative to the wheel and pinion unit is a plate 26 upon which is carried a pawl 28 by the pin 30. A spring 32 urges the pawl 28 into engagement with the teeth of the ratchet wheel 18. A swivel block 34 is pivoted through the stud 36 to the plate 26. A rod 38 is passed through a bore 40 in the block 34 and held against relative axial movement therein by a key 42 located in a slot 44 in the rod 38. The face 45 of the slot 44 locates the hand grip 46 attached to the rod 38 in a vertical position under the stress of the spring 48 while the face 49 limits the rotation of the rod 38 in the direction of the arrow by the hand grip 46 in order for the pin 50 to clear the stop 52. With the pin 50 clearing the stop 52, a rearward push upon the rod 38 through the hand grip 46 will result in the tail 54 of the pawl 28 engaging the pin 56 upon the bracket 14 to raise the pawl 28 from the teeth of the wheel 18. At the same time the surface 58 of the plate 26 acts upon the pin 60 of the holding pawl 62 to likewise raise this pawl from engagement with the teeth of the wheel 18. With the pawls 28 and 62 out of operation, the wheel and pinion unit is freed for retraction movement under the urge of the brake retractor springs (not shown) to release the brakes. As illustrated the rod 38 is supported for tilting movement between the groove roller 64 supplied in the bracket 66 mounted upon the panel 10.

The operation of the above claimed construction follows: With the parking brake released, the rack 22 will be in the position shown. To apply the brakes, the operator draws outwardly on the hand grip 46 carrying the rod 38 to the right to rock the plate 26 above the axis of the pin 16. As the plate 26 is rocked, the pawl 28, through engagement with the ratchet wheel 18 causes the wheel 18 to move with the plate 26 as a unit. As the pinion 20 has unitary movement with the wheel 18, the rack 22 geared thereto is lifted exerting an upward pull on the cable 24 to apply the brakes. Should a single stroke of the rod 38 be insufficient to fully apply the brakes, for any reason whatsoever, the hand grip 46 and rod 38 by an inward movement may be returned to the position shown in Fig. 1 and the operation repeated; the holding pawl 62 functioning to lock the wheel 18 in all positions of clockwise advancement. With the brakes fully applied, the hand grip 46 and the rod 38 may be located in the retracted position shown with the pin 50 engaging the stop 52. To release the brakes, the rod 38 is partially rotated in the direction of the arrow by turning the hand grip 46 so as to move the pin 50 to a position clearing the stop 52. An inward push on the hand grip 46 under such conditions will swing the plate 26 counter-clockwise sufficiently to release both the pawls 28 and 62; the pawl 28 being lifted through engagement between the pin 56 and tail 54, while the pawl 62 is lifted through engagement between the surface 58 and the pin 60. With the ratchet wheel 18 freed, retracting action of the brakes wil cause the same to rotate in a brake releasing direction returning the rack 22 to the position shown. It is to be noted that the movement of the rod 38 in one direction applied the brakes but that a return movement in the opposite direction does not release the brakes as in the case of a convenient parking brake. Also, the brake release arrangement requires two separate and distinct movements, namely, partial rotation of the hand grip, and an inward push. Such an arrangement avoids any possibility of accidental release.

In the modification of Fig. 4, the rod 38 is urged inwardly to engage a bumper 70 by a spring 72 acting between the bracket 66 and a collar 74 on the rod 38. In this position, the pawl 28 has been lifted from the wheel 18 by engagement with the pin 56. To release the brakes a wire 76 connected to the holding pawl 62' and to the knob 78 is provided. With this arrangement the brakes are applied in the manner described relative to Fig. 1, and released by pulling out on the knob 78. The spring 72 is strong enough to return the rod 38 to the position shown when released by the operator.

The form shown in Fig. 5 is very similar in construction and operation to that of Fig. 1 except for the fact that the swivel block 34' is connected to the pawl 80 which is in turn pivotally connected to the plate 26' by the pin 82. A stop 84 is engaged by the pawl 80 when the rod is moved inwardly to rotate the plate 26' counter-clockwise. The end of the rod 38 abuts the spring 86 to hold the pawl 80 engaging with the wheel 18 in the position shown. To release the brakes an inward push on the rod 38 will result in the pawl 80 being lifted from the wheel 18. When the pawl 80 engages the stop 84 on the plate 26', the continued inward movement of the rod 38 will cause the plate 26' to rotate counter-clockwise bringing the surface 88 in contact with the pin 90 on the holding pawl 92 to lift the latter from the wheel 18. The wheel and pinion unit is now free to rotate counter-clockwise to release the brakes.

Fig. 6 shows a modified form having a separate release member as is shown in Fig. 4. The spring 72 urges the rod 38' inwardly to bring the plate 26''' against the stop 94 and the pawl 96 is pivoted on the plate 26''' against the stop 98, lifting the pawl 96 from the teeth of the wheel 18. The end of the rod 38' is shown flattened at 100 with the pawl 96 pivotally connected by a pin 102. The holding pawl 104 is lifted from the wheel 18 through a pull wire 106 extending to the instrument panel in the manner of Fig. 4.

It is to be appreciated that the spring 72 of Figs. 4 and 5 may be omitted or so designed as to return the rods 38 and 38' just short of a position disengaging the pawls 28 and 96. With this arrangement two separate and distinct parts would have to be operated in order to release the brakes, namely, an inward push on the hand grip and outward pull on the wire connected to the holding pawl. Where extreme precaution is taken to avoid accidental release of the parking brake by children playing in an automobile, such an arrangement would be desirable.

Assuming a ratio of 4 to 1, or greater, between the ratchet wheel and pinion unit, the tooth spacing upon the ratchet wheel 18 can be relatively coarse without experiencing any difficulty in moving the hold pawls, shown in the several modifications into a position fully applying the brakes. Also, having the holding pawl located at the point of leverage, withdrawal of the pawl from the ratchet wheel is made easy. As will be understood, the mechanized leverage may readily be increased by resorting to one or more of the following expedients: (1) increasing the size of the ratchet wheel 18, (2) lengthening the plate 26 as to enable the connection of the rod 38 at a greater distance from the center of rotation, (3) decreasing the diameter of the pinion 20. Accordingly, my improved brake actuating mechanism offers considerable flexibility as to mechanism advantages and space required for its installation and operation.

The present invention is considered a continuation-in-part of my copending application, Serial No. 253,985, filed February 1, 1939.

Having described my invention what I desire to secure by Letters Patent and claim is:

1. In combination with the operator compartment of an automobile, of a brake actuating mechanism comprising a manually actuating part including a hand grip which in a retracted position is substantially flush with the outlining structure of said compartment supported for substantially linear movement toward and away from the operator, a one way operating clutch member operatively connected to said part and movable back and forth therewith, a part adapted to be operatively connected to the brakes and movable in one direction to apply the brakes, said means having a portion with which said clutch engages to move said part with a step by step movement in a brake applying position upon back and forth movement of said first part, and means for holding said brake applying means in all positions of brake applying with said first part moving in a direction other than brake applying.

2. In combination with the operator compartment of an automobile, of a parking brake actuating mechanism comprising a reciprocated part having a hand grip, means supporting said part with said grip within reach of the operator when in an inward position relative to the compartment space, brake connected means movable in one direction to apply the brake and in another direction to release the brake, means to couple said part to said brake connected means to move the latter in a brake applying direction when said part is moved outwardly into said compartment by the operator, and releasable means for holding said brake connected means against brake releasing movement upon the return of said part to inward position.

3. In combination a brake actuating mechanism comprising a reciprocable part movable inwardly and outwardly along its longitudinal axis, said part having a hand grip, means supporting said part, brake connected means movable in one direction to apply the brake and in another direction to release the brake, means to couple said part to said brake connected means to move the latter in brake applying direction when said part is moved outwardly, releasable means for holding said brake connected means against brake releasing movement upon return of said part to its inward position, said part being oscillatable from one position to another about its longitudinal axis, brake releasing means operable by said part, said brake applying means being operable in one oscillated position of said part and said brake releasing means being operable in another oscillated position of said part.

SAMUEL A. SNELL.

CERTIFICATE OF CORRECTION.

Patent No. 2,329,859. September 21, 1943.

SAMUEL A. SNELL.

It is hereby certified that error appears in the printed specification of the above numbered patent requiring correction as follows: Page 1, first column, line 15, for the word "arm" read --arc--; and that the said Letters Patent should be read with this correction therein that the same may conform to the record of the case in the Patent Office.

Signed and sealed this 16th day of November, A. D. 1943.

(Seal)
Henry Van Arsdale,
Acting Commissioner of Patents.